United States Patent [19]

Wuchenauer

[11] Patent Number: 4,620,417
[45] Date of Patent: Nov. 4, 1986

[54] CONTROL DEVICE FOR A HYDROSTATIC GEAR DRIVEN BY A DRIVE ENGINE

[75] Inventor: Johann Wuchenauer, Opferstetten, Fed. Rep. of Germany

[73] Assignee: Hydromatik GmbH, Fed. Rep. of Germany

[21] Appl. No.: 661,400

[22] Filed: Oct. 16, 1984

[30] Foreign Application Priority Data

Oct. 24, 1983 [DE] Fed. Rep. of Germany ....... 3338595

[51] Int. Cl.⁴ ............................................. F16H 39/46
[52] U.S. Cl. ......................................... 60/431; 60/447
[58] Field of Search ................. 60/445, 447, 431, 413; 417/217, 216, 218

[56] References Cited

U.S. PATENT DOCUMENTS

| 3,908,377 | 9/1975 | Riedhammer | 417/217 X |
| 3,932,993 | 1/1976 | Riedhammer | 60/447 X |
| 3,943,715 | 3/1976 | Miyao et al. | 60/447 X |
| 3,986,357 | 10/1976 | Hoffmann | 60/447 X |
| 4,158,529 | 6/1979 | Nonnemacher et al. | 60/447 X |
| 4,192,337 | 3/1980 | Alderson et al. | 60/413 X |

FOREIGN PATENT DOCUMENTS

| 2247437 | 1/1974 | Fed. Rep. of Germany | 60/447 |
| 3120278 | 5/1981 | Fed. Rep. of Germany | 60/447 |

Primary Examiner—Edward K. Look
Attorney, Agent, or Firm—Scully, Scott, Murphy & Presser

[57] ABSTRACT

A control device for a hydrostatic gear driven by a drive engine, preferably an internal-combustion engine, is described, having an auxiliary pump, which is driven synchronously with the drive engine speed, for the generation of a control pressure which may be adjusted by way of a regulating valve, which is dependent upon the speed of the drive engine and which acts upon the setting mechanism for the hydrostatic gear. A pressure reducing valve ("inch" valve) is thereby provided for the purpose of shutting off the control pressure as a function of an external parameter and also for lowering the control pressure in the case of a load speed reduction of the drive engine ("partial inch" function).

4 Claims, 4 Drawing Figures

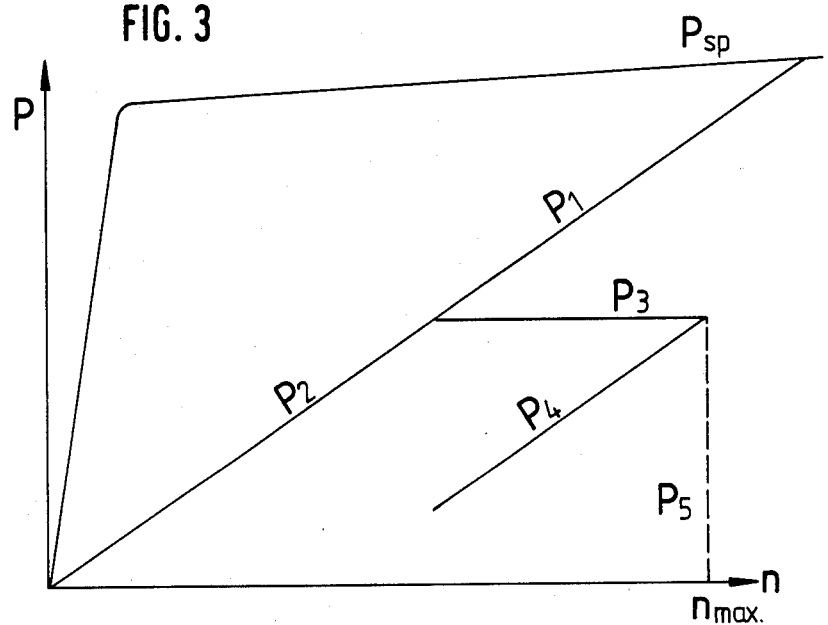
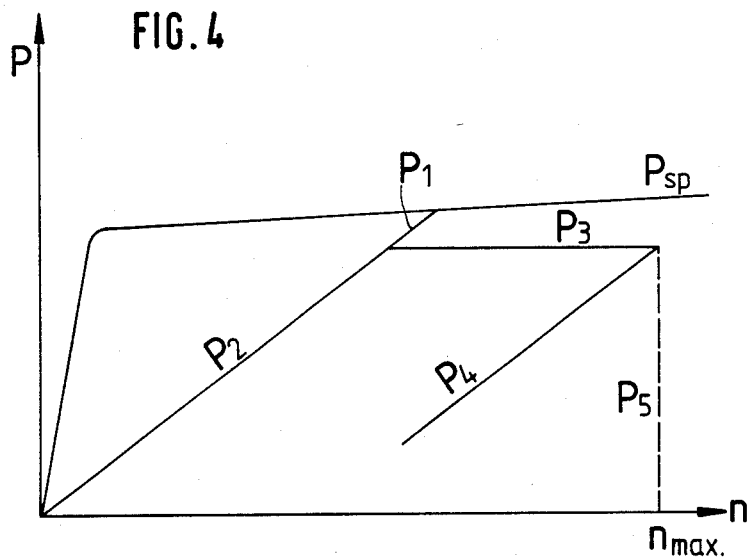

CONTROL DEVICE FOR A HYDROSTATIC GEAR DRIVEN BY A DRIVE ENGINE

TECHNICAL FIELD OF INVENTION

The invention relates to a control device for a hydrostatic gear driven by a drive engine, preferably an internal-combustion engine, having an auxiliary pump driven synchronously with the drive engine speed to produce a control pressure adjustable via a regulating valve and dependent upon the speed of the drive engine, in a control line, which is connected to the setting mechanism of the hydro-pump and/or the hydro-motor of the hydrostatic gear, having a pressure reducing valve ("inch" valve) in the control line to eliminate (shut off) the control pressure as a function of an external parameter, and also having a regulating device to limit the control pressure from a predetermined speed of the drive engine, wherein the pressure reducing valve (inch valve) comprises a spool valve which delimits a first control area, which is connected with a control pressure medium inlet, and a second control area, which is connected with the pressureless outlet, and which connects the control pressure line, which leads to the setting mechanism of the hydro-pump and/or of the hydro-motor, with the first or second control area via restrictors and wherein the spool valve has, on the one side, a control surface with associated cylinder area, by way of which surface control pressure medium is able to act upon the spool valve in the direction of adjustment for "opening of the control pressure line to the pressureless outlet" against the force of a pressure spring, which, on the other side, acts on the spool valve and which may be adjusted by the external parameter, and the regulation of the control pressure as a function of the speed of the drive engine takes place owing to the fact that the cylinder area is connected with the control pressure line which is on the downflow side and which leads to the setting mechanism.

DESCRIPTION OF THE PRIOR ART

A control device of this kind has become known from U.S. Pat. No. 4,571,940 corresponding to German Patent Specification No. 3120278, by the same inventor and assigned to a common assignee, the specification of which is hereby incorporated by reference. In this patent, a device which renders possible all-hydraulic partial and complete "inch" function is described for the first time. The difference between partial and complete inch functions is described there in detail. On account of the negative overlap, necessary in the case of the known apparatus, of the restrictors, which are formed on the spool valve of the inch valve and which, opening and closing in opposite directions, convey the control pressure medium to the setting mechanism of the hydro-pump and/or of the hydro-motor or to the pressureless outlet, this known control device operates with a high level of leakage oil loss. Negative overlap of the restrictors means that the two restrictors, opening and closing in opposite directions, are not closed at the same time in any controlled condition.

A further disadvantage of the known device may be seen in the fact that in the state of partial inch function the regulating action of the spool valve in the inch valve is made ineffective as it is no longer the control pressure, which is dependent upon the speed of the drive engine, or the setting pressure, which is derived therefrom, as a regulating variable, but only the accumulated "inch" pressure which acts on the one end surface of the spool valve.

BRIEF DESCRIPTION OF THE INVENTION

The underlying object of the invention is to improve a control device of the named kind by maintaining the regulating action for the torque of the hydrostatic gear through adjustment of the corresponding control pressure, even during partial inch function, that is, load speed reduction of the drive engine.

To achieve this object, proposals are made according to the invention with respect to a control device of the kind named by way of introduction, the said device having an auxiliary pump, which is driven in synchronism with the drive engine speed, for the generation of a control pressure, adjustable by way of a regulating valve and dependent upon the speed of the drive engine, in a control line, which is connected with the setting mechanism of the hydropump and/or of the hydro-motor of the hydrostatic gear, having a pressure reducing valve (inch valve), which is arranged in the control line, to eliminate (shut off) the control pressure as a function of an external parameter, and also having a regulating device to limit the control pressure from a predetermined speed of the drive engine, wherein the pressure reducing valve (inch valve) comprises a spool valve which delimits a first control area, which is connected with a control pressure medium inlet, and a second control area, which is connected with the pressureless outlet, and which connects the control pressure line, which leads to the setting mechanism of the hydropump and/or of the hydro-motor, with the first or second control area by way of restrictors and wherein the spool valve has, on the one side, a control surface with associated cylinder area, by way of which surface control pressure medium is able to act upon the spool valve in the direction of adjustment for "opening of the control pressure line to the pressureless outlet" against the force of a pressure spring, which, on the other side, acts on the spool valve and which may be adjusted by the external parameter, and the regulation of the control pressure as a function of the speed of the drive engine takes place owing to the fact that the cylinder area is connected with the control pressure line which is on the downflow side and which leads to the setting mechanism.

The fundamental idea of the invention is to separate the effect of the pressure, accumulated for carrying out the partial inch function, from the effect of the control pressure for the torque regulation and, for this purpose, to derive the pressure, which is dependent upon speed and which is to be accumulated for performing the partial inch function, in another way, that is, not from the control pressure or setting pressure. The accumulated "inch" pressure is to be added to the setting pressure; both pressures are to operate independently so that the regulating action of the control pressure is maintained even if the accumulated "inch" pressure is taking effect.

This is achieved by means of the measuring surfaces which are provided according to the invention and which are developed on the spool valve or on measuring pistons which rest against the spool valve. The "inch" pressure, which is to be accumulated for the partial inch function, acts on the measuring surfaces which are independent of the control surface for the control pressure applied at the spool valve. The regulating action is maintained when no partial inching takes place and if partial inching does take place, then the partial inch pressure (auxiliary control pressure) is added to the control pressure, which regulates torque, by way of the measuring surfaces. The slope of the partial "inch" curve $P_4$ according to the graphical representation in FIGS. 3 and 4 explained below may be given by the dimensioning of the size of the measuring surfaces.

The partial "inch" function is performed with the aid of the pressure reservoir and the check valve or distributing valve in accordance with the device known from U.S. Pat. No. 4,571,940. Accordingly, the check valve and the distributing valve can be combined functionally, in an advantageous development according to claim 4, to form a releasable check valve. A further essential advantage of the device according to the invention is the fact that as the negative overlap of the restrictors on the spool valve, as described by way of introduction, is not necessary in the case of the development according to the invention, continuous leakage oil losses are avoided.

In the case of the first embodiment of the invention which is characterized in claim 2 and which is described in the following, it is necessary to run the device with a high level of system pressure in order to obtain a pressure $P_1$, which is proportional to the speed, up to the maximum speed. In the case of the second embodiment which is characterized in claim 3, the control device may be run with a considerably lower level of system pressure. The inch pressure (auxiliary control pressure), which is dependent upon the speed, is determined by the pressure difference at a restrictor and the level of control pressure does not need to be planned additionally even for carrying out the inch function.

BRIEF DESCRIPTION OF THE DRAWINGS

An exemplary embodiment of the invention is described in greater detail in the following with the aid of the attached drawings.

FIGS. 3 and 4 show the control curves of the control pressure as a function of the speed of the drive engine in accordance with the first and second embodiment of the invention.

DETAILED DESCRIPTION OF THE INVENTION

Figure 1:
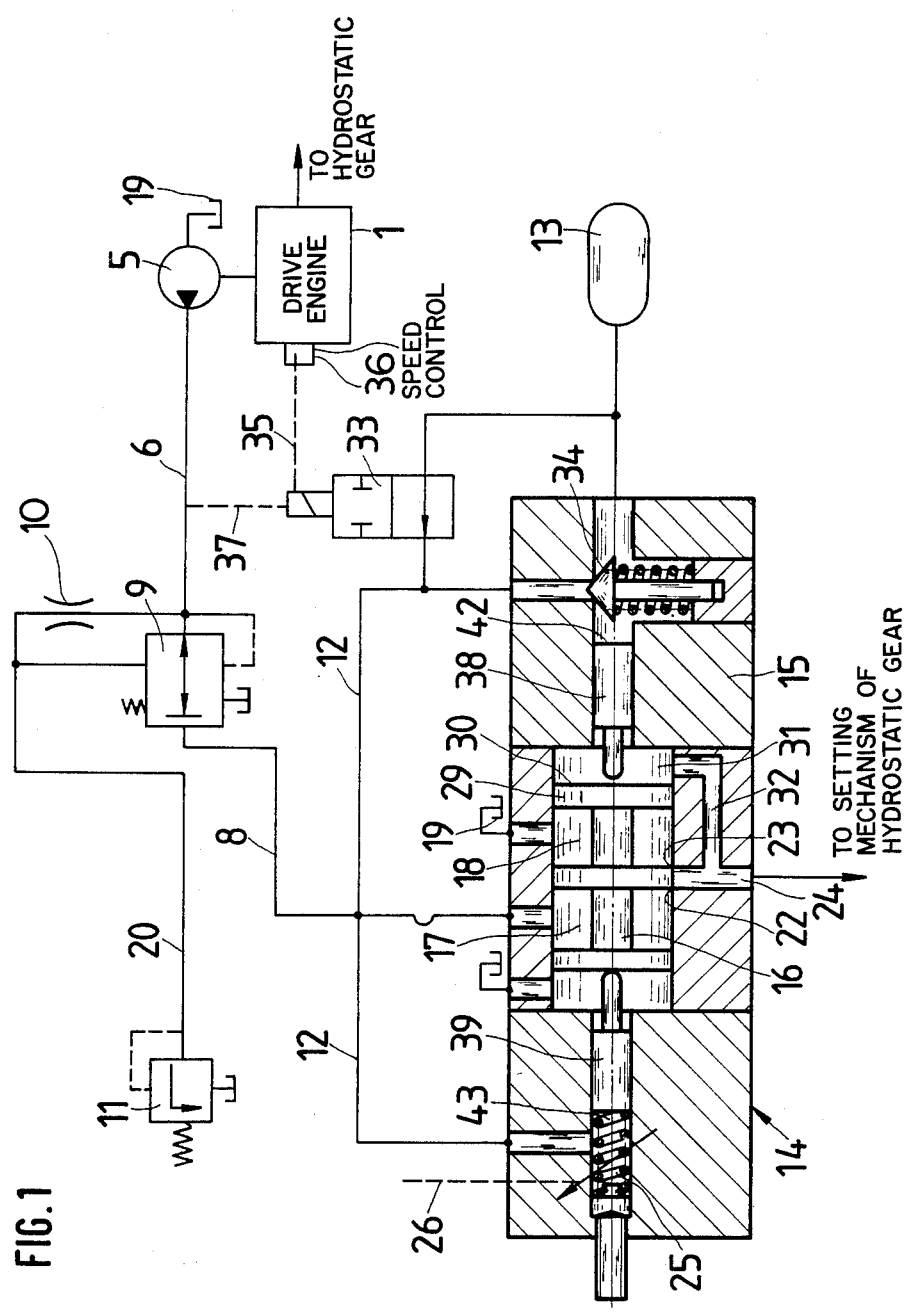
FIG. 1 shows the pressure reducing valve (inch valve) diagrammatically, in section and enlarged in respect of its circuit represented diagrammatically according to the first embodiment.

The hydrostatic gear, which is not represented, consists of a hydro-pump and of a hydro-motor, the hydro-pump being driven in rotation by a drive engine 1, preferably by an internal-combustion engine. An auxiliary pump 5, which is represented and which delivers hydraulic fluid, preferably hydraulic oil, into a control line 8 by way of a line 6, is driven in rotation together with the hydro-pump which is not represented. In the line 6 there is a regulating valve 9 which sets up a control pressure in the control line 8, the said control pressure, depending upon the design of the regulating valve 9, having a specific proportional dependence upon the control pressure in the line 6 and thus on the speed of the drive engine 1. The construction of the regulating valve 9 and the regulating action may, for example, correspond to the control device, which is described in German Auslegeschrift No. 22 47 437, or to the regulating valve 10 described therein. The control line 8 leads by way of a pressure reducing valve (inch valve) 14 to the setting mechanism (not shown) of the hydro-pump of the hydrostatic gear. This pressure reducing valve 14 carries out the action of regulating the torque, as required for the invention, for the hydrostatic gear and the inch function. The inch valve 14 is diagrammatically represented in section on an enlarged scale. It comprises a valve housing 15 in which there is arranged a spool valve 16 which delimits a first control area 17 and a second control area 18. The control line 8 runs into the first control area 17. The second control area 18 is connected with the outlet 19. The spool valve 16 has control edges which define restrictors 22, 23 between which a control pressure line 24 issues. Clearly, the restrictors 22, 23 may be altered in opposite directions through a corresponding shift of the spool valve 16. The spool valve 16 is loaded, according to FIGS. 1 and 2, on the left-hand side by a pressure spring 25 and may be prestressed in the direction of movement towards the right in FIGS. 1 and 2. The force of the spring 25 may be adjusted in a known way and the adjustment of the initial stressing force of the spring 25 is controlled by way of a control connection 26 mechanically, hydraulically or electrically as a function of an external parameter, for example, of the position of a brake pedal, which is not represented, of a device, for example, a vehicle, construction machine or the like, which is driven by the hydrostatic gear by way of the latter's driving shaft.

Figure 2:
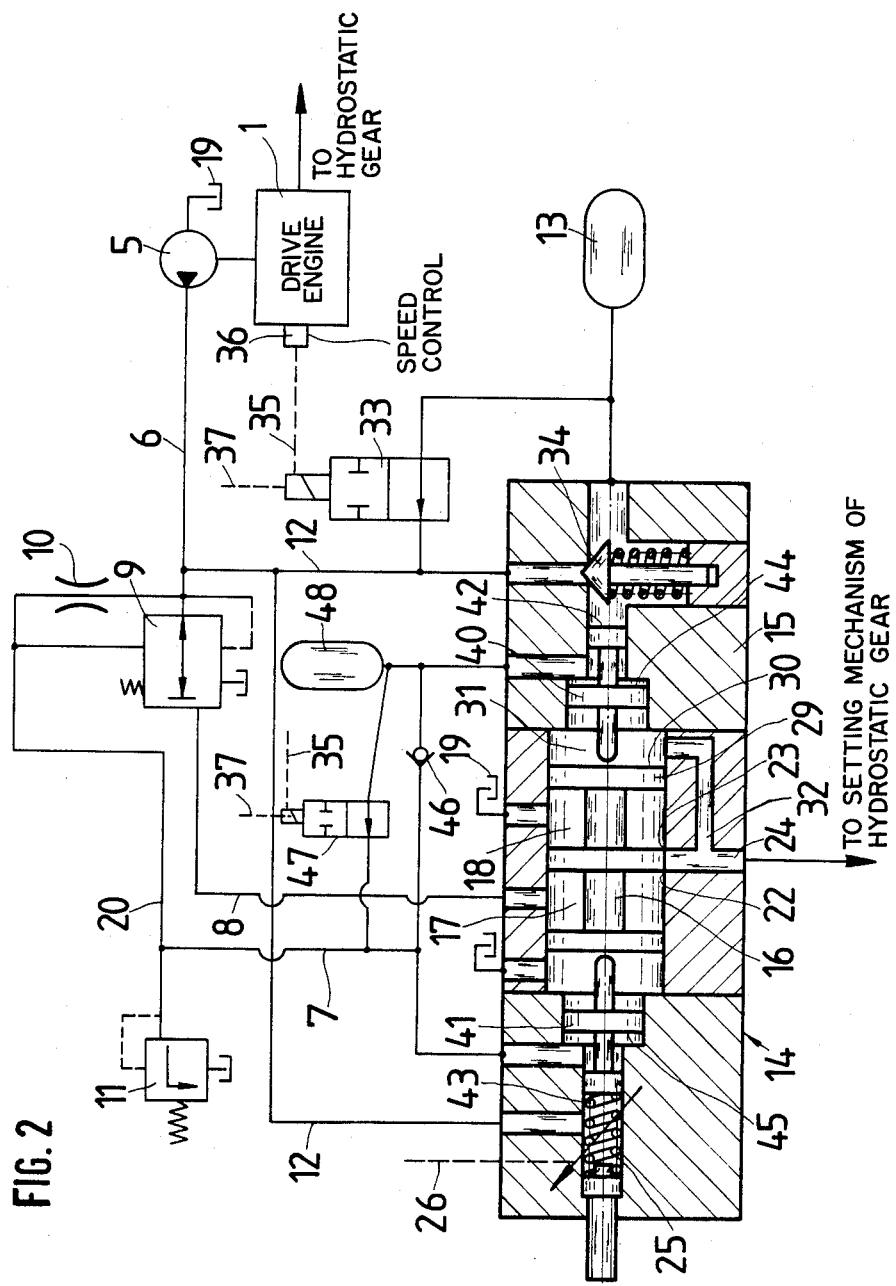
FIG. 2 shows the pressure reducing valve (inch valve) diagrammatically, in section and enlarged in respect of its circuit represented diagrammatically according to the second embodiment.

According to the representation in FIGS. 1 and 2, the spool valve 16 has, on the right, a piston portion 29 which has a control surface 30 which delimits a cylinder area 31. The cylinder area 31 is connected with the adjusting pressure line 24, which leads to the adjusting device of the hydraulic pump of the gear, by way of a line 32. Measuring pistons 38 and 39 (or 40 and 41 according to FIG. 2), each of which has a measuring surface 42 or 43, are arranged on both sides of the spool valve 16.

In the case of the first embodiment represented in FIG. 1, the areas in front of the measuring surfaces 42 and 43 are, in each case, connected by way of a line 12 with the control line 8 after the regulating valve 9 so that a control pressure, which corresponds to the speed of the drive engine 1, can be set up before the measuring piston or its measuring surfaces 42, 43. A check valve 34, which opens to the area in front of the measuring surface 42, is arranged in that portion of the line 12 which leads to the area in front of the measuring surface 42 of the right-hand measuring piston 38 according to FIG. 1. A 2/2 distributing valve 33 is arranged parallel to the check valve 34. In addition, the area, which lies in front of the measuring surface 42, is connected with a pressure reservoir 13. The system pressure for the regulating device is determined by a pressure relief valve 11 which is connected by means of line 20.

In the case of the circuit arrangement represented in FIG. 2 for the second embodiment of the invention, parts which have already been described above in connection with FIG. 1, are given the same reference numerals and are not explained again. The measuring pistons are constructed here as differential pistons 40, 41 having the measuring surfaces 42 and 43 and additional piston surfaces 44, 45.

A restrictor 10 (screen), which may be integrated functionally in the regulating valve 9, is located in the control line 6 which comes from the auxiliary pump 5 and in which a control pressure, which corresponds to the speed of the drive engine 1, is set up by the auxiliary pump 5. The lines 6 and 20 are connected with the measuring surfaces 42, 43, or piston surfaces 44, 45 of the measuring pistons 40, 41, by way of the lines 12 and 7 before and after the restrictor 10, so that a total pressure, which corresponds to the speed of the drive engine 1, acts on the measuring pistons or their surfaces. Check valves 34 and 46, which open, in each case, to the area in front of the surfaces 42 and 44, are arranged in those portions of the lines 7 and 12 which lead to the areas in front of the surfaces 42 and 44 of the right-hand measuring piston 40. A 2/2 distributing valve 33, 47 is arranged, in each case, parallel to the check valves 34, 46. In addition, the areas, which lie in front of the surfaces 42, 44, are connected in each case with a pressure reservoir 13, 48.

It holds good for both embodiments that the distributing valves 33, 47 have two positions, opened and closed, and that they are connected, for example, by way of an electrical control connection 35 with the speed adjusting element 36 of the drive engine 1, thus, for example, with the gas pedal of the internal-combustion engine 1, and that they are switched into the positions, open and closed, depending on the position of the gas pedal 36. The distributing valves 33, 47 are connected with the brake pedal, which is not represented, of a device, which is driven by the hydrostatic gear, by way of a further control connection 37 which may also be an electrical connection. The aforementioned control line 26 is connected with this brake pedal accordingly. The distributing valves 33, 47 may also be switched into their two positions, according to the position of the brake pedal. The check valves 34, 46 and the distributing valves 33, 47 may also be combined functionally in the form of check valves, which are capable of being released, the latching and releasing of the check valves taking place through a signal in the control connection 35 or 37.

The method of operation of the control device according to the invention corresponds to and is identical with that method of operation described in U.S. Pat. No. 4,571,940 with the distinction that the inch function setting pressure, which is dependent upon speed, acts on the surfaces 42, 44 of the measuring piston 40 and via these on the control surface 30 and not directly on the control surface 30. The advantages cited by way of introduction are thus achieved.

1. Acceleration at the drive engine 1:

The 2/2 distributing valves 33, 47 are closed by means of a corresponding switching pulse in the control connection 35 as a function of the position of the speed adjusting element 36 in the drive engine 1. The pressure, which is dependent upon the speed of the drive engine 1, in the control lines 6 and 20 before and after the screen 10 is transmitted to the surfaces 42 and 44 by way of the lines 12 and 7 and the opening check valves 34 and 46. The characteristic curve region traversed is given by the control curves $P_2$ and $P_3$ in the graphical representation in FIGS. 3 and 4, and explained below.

2. Deceleration of the drive engine 1:

The 2/2 distributing valves 33, 47 are opened by means of a corresponding switching pulse in the control connection 35 as a function of the speed adjusting element 36 of the drive engine 1. The inch function control pressure before the surfaces 42 and 44 of the measuring piston 40 may be reduced by way of the opened distributing valves 33, 47 by way of the regulating valve 9, in accordance with the simultaneous drop in the control pressure in the line 6 in accordance with the decrease in the speed of the driving engine 1. The characteristic curve region $P_3$ and $P_2$ in the graphical representation in FIGS. 3 and 4 is traversed.

3. Load speed reduction at the drive engine 1 and maximum load regulation:

The 2/2 distributing valves 33, 47 are closed as the speed adjusting element 36 is in a position corresponding to the state 1, that is, for acceleration. The pressure, which is dependent upon the speed, in the control line 6 before the restrictor 10 and therewith the pressure in the line 12 is reduced through the load speed reduction. The check valves 34, 46 are closed. The pressure, which corresponds to the last speed of the drive engine 1 before the load speed reduction which is setting in, for example, through overload, is accumulated in the pressure reservoirs 13 and 48 and acts on the surfaces 42 and 44 of the measuring piston 40 and by way of the latter on the control surface 30 with displacement of the valve 16 in FIG. 1 towards the left. The pressure, which acts on the surfaces 43 and 45 of the measuring piston 41, in the lines 12 and 7 corresponds to the speed, which has been reduced by the load speed reduction, so that the accumulated pressure overbalances onto the surfaces 42 and 44 and the said movement of the spool valve 16 towards the left takes place. In the case of this partial inch function, the characteristic curve region traversed is along the curve $P_4$ in FIGS. 3 and 4. The slope of the curve $P_4$ is then dependent upon the size of the surfaces 42 and 44 on the measuring piston 40 in proportion to the pressure selected in the lines 12 and 7, this pressure being dependent upon the speed. It is within the scope of the invention to use another pressure which is available and which is dependent upon the speed of the drive engine 1 or another signal for the partial inch function for the purpose of acting upon the measuring pistons 40 and 41 instead of the control pressure in the line 8 after the control valve 9 or instead of the pressure which is dependent upon the speed and which is taken off before and after the restrictor 10.

The progression of the control pressures, which are adjusted in the control pressure line 24, is plotted diagrammatically on graphs in FIGS. 3 and 4 as a function of the speed of the drive engine 1, the progression according to the first embodiment according to FIG. 1 being plotted in FIG. 3 and the progression according to the second embodiment of the invention being plotted in FIG. 4. The abbreviations have the following meanings:

n speed of the drive engine 1
$n_{max}$ maximum speed of the drive engine 1
P pressure
$P_{sp}$ system pressure, which is dependent upon the speed, after the auxiliary pump 5
$P_1$ pressure, which is proportional to the speed, in the control line 8 after the control valve 9
$P_2$ control pressure, which is proportional to the speed, in the control pressure line 24 to the setting device of the hydraulic pump
$P_3$ the reduced control pressure in the control pressure line 24 for the inch function of a given speed of the drive engine 1
$P_4$ the control pressure in the control pressure line 24 during the partial inch function in the case of load speed reduction of the drive engine 1 through overload P₅ the drop in control pressure in the case of complete inch function.

Upon acceleration and deceleration of the drive engine 1 through corresponding adjustment of the speed adjusting element 36, the control pressure in the control pressure line 24 is regulated along the curves $P_2$ and $P_3$. When the drive engine 1 is overloaded on account of a decrease in output, which is too high, at the drive shaft of the hydrostatic gear which is not represented, the control pressure in the line 24 is adjusted along the curve $P_4$. In the case of the complete inch function which is not described again in greater detail for the purposes of this application, the control pressure is reduced immediately, substantially in accordance with the curve $P_5$. This takes place through a corresponding switching pulse in the control connection 26 through adjustment of the initial stressing force of the spring 25.

The device according to the invention renders possible, in accordance with the subject matter of U.S. Patent No. 4,571,940, an all-hydraulic partial and complete inch function, with the added advantages that on account of the arrangement of the measuring pistons and therewith structural separation of the control surface 30 for the regulation of torque and the measuring surface 42 or the piston surfaces 42 and 44 for the inch function, the slope of the control curve $P_4$ may be chosen and the regulation of torque does not become ineffective during the partial inch function. In the case of the embodiment according to FIG. 2 in accordance with the graphical representation in FIG. 4, it is possible to proceed with an essentially lower system pressure $P_{sp}$, as the latter does not need to be run up for the derivation of a control pressure $P_1$, which is proportional to the speed, up to the maximum speed $n_{max}$.

I claim:

1. Control device for a hydrostatic gear driven by a drive engine, preferably an internal-combustion engine, comprising:
    an auxiliary pump driven synchronously with the drive engine to produce a control pressure, adjustable via a regulating valve and dependent upon the speed of the drive engine, in a control line connected to the setting mechanism of the hydro-pump and/or the hydro-motor of the hydrostatic gear,
    a regulating device to limit the control pressure from a predetermined speed of the drive engine,
    a pressure reducing valve in the control line to eliminate the control pressure as a function of an external parameter,
    the pressure reducing valve comprising:
    (1) a spool valve which delimits a first control area connected with a control pressure medium inlet and a second control area connected with a pressureless outlet, said spool valve connecting the control pressure line leading to the setting mechanism of the hydro-pump and/or of the hydro-motor with the first or second control area via restrictors, and said spool valve having, on one side, a control surface with associated cylinder area on which surface control pressure medium is able to act upon the spool valve in the direction of adjustment for opening of the control pressure line to the pressureless outlet against the force of a pressure spring which acts on the other side of the spool valve and which may be adjusted by the external parameter, said cylinder area being connected to the control pressure line on the downflow side leading to the adjusting device thereby regulating the control pressure as a function of the speed of the drive engine,
    (2) a pair of measuring pistons one of which lies between the pressure spring and the spool valve and the other rests against the control surface of the spool valve each said measuring pistons having measuring surfaces which operate against each other and upon which said control pressure acts,
    an auxiliary control pressure line through which an auxiliary control pressure, dependent upon the speed of the drive engine, communicates with the control surface of said spool valve, and
    a pressure reservoir, to which the auxiliary control pressure medium may be supplied through a check valve which opens to the pressure reservoir, and through a 2/2 distributing valve arranged parallel to said check valve in the auxiliary control pressure line operating in the direction of the control surface of the spool valve, whereby the control pressure is reduced as a function of the position of a speed adjusting element of the drive engine as the distributing valve is closed when the speed adjusting element of the drive engine is in the position "acceleration" and is opened when the element is in the position "deceleration".

2. Control device according to claim 1, characterized in that the control pressure in the control line is used as the auxiliary control pressure which is dependent upon speed and which is transmitted to the measuring surfaces.

3. Control device according to claim 1, characterized in that the auxiliary control pressure, which is dependent upon the speed of the drive engine, is taken off as pressure before and after a restrictor which is arranged on the downflow side of the auxiliary pump, in that the measuring pistons are constructed as differential pistons with an additional piston surface and the pressure prevailing behind the restrictor is transmitted, in each case, to the additional piston surfaces and in that a pressure reservoir, to which the auxiliary control pressure medium may be supplied by way of a check valve, which opens to the pressure reservoir, and by way of a 2/2 distributing valve, which is arranged parallel to the said check valve, is formed in the supply line to the additional piston surface of the measuring piston which rests against the control surface, in which case the 2/2 distributing valves are switched at the same time as a function of the position of the speed adjusting element of the drive engine.

4. Control device according to claim 1, characterized in that the check valve and the distributing valve are combined functionally in the form of a check valve which is releasable, in which case the check valve is released when the speed adjusting element is set at "deceleration".

* * * * *